United States Patent
Komori et al.

(10) Patent No.: US 7,223,800 B2
(45) Date of Patent: May 29, 2007

(54) METHOD FOR PRODUCING REGENERATED FLUORORESIN AND REGENERATED FLUORORESIN ARTICLE

(75) Inventors: Masaji Komori, Settsu (JP); Takuya Arase, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 415 days.

(21) Appl. No.: 10/333,458

(22) PCT Filed: Jul. 19, 2001

(86) PCT No.: PCT/JP01/06282

§ 371 (c)(1),
(2), (4) Date: Jan. 22, 2003

(87) PCT Pub. No.: WO02/08325

PCT Pub. Date: Jan. 31, 2002

(65) Prior Publication Data

US 2003/0125400 A1    Jul. 3, 2003

(30) Foreign Application Priority Data

Jul. 24, 2000 (JP) .............................. 2000-222804

(51) Int. Cl.
  *C08J 11/06* (2006.01)
  *C08J 11/04* (2006.01)
  *C08J 3/00* (2006.01)
(52) U.S. Cl. ..................... 521/46; 528/501; 528/503
(58) Field of Classification Search ............... 521/46; 528/501, 503
See application file for complete search history.

(56) References Cited

U.S. PATENT DOCUMENTS 4,908,415 A * 3/1990 Aramaki et al. ............. 525/356

FOREIGN PATENT DOCUMENTS

| JP | 58-13633 | | 1/1983 |
| JP | 58-196235 | | 11/1983 |
| JP | 59217734 A | * | 12/1984 |
| JP | 63218319 A | * | 9/1988 |
| JP | 2-102235 | | 4/1990 |
| JP | 3-265606 | | 11/1991 |
| JP | 8-245717 | | 9/1996 |
| JP | 8-259727 | | 10/1996 |
| JP | 08291228 A | * | 11/1996 |
| JP | 11-300741 | * | 2/1999 |
| JP | 11-158218 | | 6/1999 |
| JP | 11-300741 | | 11/1999 |

OTHER PUBLICATIONS

International Preliminary Examination Report for PCT/JP01/06282 dated Mar. 18, 2002.

* cited by examiner

*Primary Examiner*—Tae H Yoon
(74) *Attorney, Agent, or Firm*—Sughrue Mion, PLLC

(57) ABSTRACT

A method for producing a regenerated fluororesin, characterized in that it comprises subjecting a used melt-molded fluororesin article to a heat treatment at a temperature of from room temperature to the melting point of the resin; a method for producing a regenerated fluororesin, characterized in that it comprises subjecting a used melt-molded fluororesin article to a supercritical washing treatment at a temperature of from room temperature to the melting point of the resin; and a regenerated fluororesin article containing substantially no impurities which is obtainable by the above method.

14 Claims, 1 Drawing Sheet

Effect of the temperature of heat treatment

Effect of pure-water washing

METHOD FOR PRODUCING REGENERATED FLUORORESIN AND REGENERATED FLUORORESIN ARTICLE

TECHNICAL FIELD

The present invention relates to a method for producing a recycled fluororesin by removing chemicals and organic and inorganic matters contained in a used, molded fluororesin article to such a degree that the fluororesin can be reused, and also relates to a recycled fluororesin article produced according to the method.

BACKGROUND OF THE INVENTION

In the field of semiconductors, fluororesins are widely used due to their excellent heat resistance, chemical resistance and high purity, not only as materials for peripheral parts such as carriers, couplings, tubes, square tanks and the like but also as materials in the area of production and supply of chemicals.

Various researches have been conducted particularly with regard to carriers, due to recent demands for higher purity in processing technologies for semiconductor production. A phenomenon, in which the chemicals and gases that are impregnated into a fluororesin contaminate other chemical tanks or, by gas generation, contaminate wafers, is known as chemical carryover. To prevent this phenomenon, known cleaning methods are, for example, heat treatment at a temperature of 150° C. for 30 minutes, pure-water boiling, heat treatment by nitric acid, etc.

When their cleaning capacity reaches the limit, carriers also reach their application limit and are disposed of. Sometimes carriers reach their application limit due to wear caused by friction, etc., occurring between carrier bodies and wafers.

Generally, as a method for disposing of molded resin parts that have reached their application limit and are no longer in use, various methods for regenerating and reusing the resin parts are proposed in the field of widely used resins such as polyethylene and the like, and some of the methods are already in practical use. However, in the field of fluororesins to which the present invention relates, few methods of regeneration and reuse are known. The inventors are aware of the disclosure of only one method, which is that in Japanese Unexamined Patent Publication No. 300741/1999. Specifically, a fluororesin film composed of a tetrafluoroethylene/ethylene copolymer and used as a covering material for an agricultural greenhouse is washed with a washing liquid and dried; if necessary, surface coatings other than fluororesins are separated and removed by impact compression milling; and then, pellets are produced therefrom by melt extrusion using an extruder.

As described above, few methods have been explored for regeneration and reuse of molded fluororesin articles. The reason is that fluororesin articles have commonly been disposed of into landfills due to their small amount.

However, as the use of fluororesins has recently increased, the disposal amount has also increased. Moreover, from the viewpoint of adapting our societies to recycling, there have been demands for a method for regenerating molded fluororesin articles.

An object of the present invention is to provide a method for producing a recycled fluororesin wherein impurities such as chemical fluids and the like and chemicals are removed to the extent that the same degree remains as is contained in unused fluororesins.

DISCLOSURE OF THE INVENTION

Figure 1:
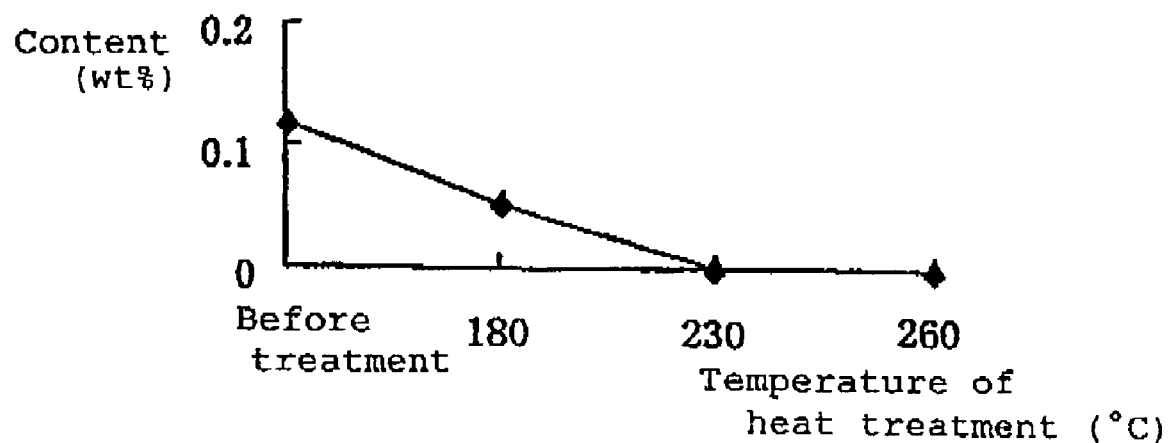
FIG. 1 illustrates the sulfate ion content of the sample of Example 1, which was subjected to a heat treatment after being immersed in sulfuric acid, and the sulfate ion content of the sample of Comparative Example 1, which was subjected to a cleaning treatment by pure boiling water after being immersed in sulfuric acid.
Figure 1:
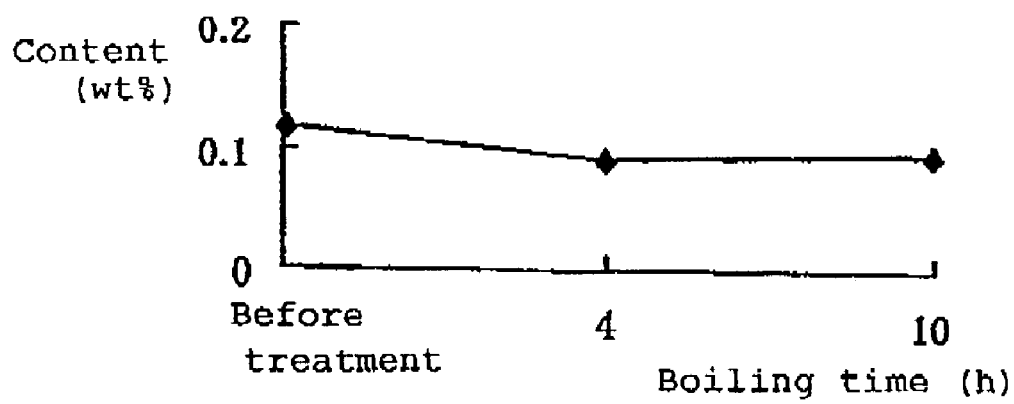

Under the circumstances described above, the inventors conducted research to find a method for regenerating a used, molded fluororesin article, and found a method for obtaining an excellent recycled fluororesin by removing from the molded article organic and inorganic matters that can not be removed by methods such as rinsing and melt extrusion disclosed in Japanese Unexamined Patent Publication No. 300741/1999.

Specifically, the inventors have found that organic and inorganic impurities can be removed by subjecting a used fluororesin article to a heat treatment under a temperature condition ranging from room temperature to the melting point thereof, and the fluororesin can be recycled.

The present invention relates to the following methods for producing recycled fluororesins and recycled fluororesin articles.

Item 1. A method for producing a recycled fluororesin comprising subjecting a used, melt-molded fluororesin article to a heat treatment under a temperature condition ranging from room temperature to the melting point thereof.

Item 2. A method for producing a recycled fluororesin according to Item 1, wherein the used, melt-molded fluororesin article is subjected to a heat treatment under a temperature condition ranging from 200° C. to the melting point thereof.

Item 3. A method for producing a recycled fluororesin according to Item 1, wherein the used, melt-molded fluororesin article is subjected to a heat treatment under a temperature condition ranging from 230° C. to the melting point thereof.

Item 4. A method for producing a recycled fluororesin according to Item 1, wherein the used, melt-molded fluororesin article is subjected to a heat treatment under a temperature condition ranging from 260° C. to the melting point thereof.

Item 5. A method for producing a recycled fluororesin according to Item 1, wherein the heat treatment is conducted in water vapor.

Item 6. A method for producing a recycled fluororesin according to any of Items 1 to 5, wherein the method comprises a process of fluorination conducted simultaneously with or after the heat treatment of the used, melt-molded fluororesin article.

Item 7. A method for producing a recycled fluororesin according to Item 6, wherein the process of fluorination comprises contacting with fluorine gas at a temperature of 150° C. to 250° C.

Item 8. A method for producing a recycled fluororesin comprising subjecting a used, melt-molded fluororesin article to a supercritical cleaning treatment under a temperature condition ranging from room temperature to the melting point thereof.

Item 9. A method for producing a recycled fluororesin according to any of Items 1 to 8, wherein the method comprises a step for cutting the used, melt-molded fluororesin article into chip-size pieces before the heat treatment or supercritical cleaning treatment.

Item 10. A method for producing a recycled fluororesin according to Item 9, wherein the fluororesin article is cut into chip-size pieces having a diameter of 0.5 to 10 mm.

Item 11. A method for producing a recycled fluororesin according to any of Items 1 to 10, wherein the used, melt-molded fluororesin is a copolymer having a repeating unit derived from tetrafluoroethylene and perfluoro (alkylvinylether) or a copolymer having a repeating unit derived from tetrafluoroethylene and hexafluoropropylene.

Item 12. A method for producing a recycled fluororesin according to any of Items 1 to 11, which further comprises a step of mixing an unused fluororesin, Item 13. A recycled fluororesin article containing substantially no impurities, the article being obtained according to any method of Items 1 to 12.

Examples of fluororesins to be recycled include polytetrafluoroethylene (melting point: 327° C.), a copolymer having a repeating unit derived from tetrafluoroethylene and perfluoro(alkylvinylether) (hereinafter referred to as "PFA", melting point: 310° C.), a copolymer having a repeating unit derived from tetrafluoroethylene and hexafluoropropylene (hereinafter referred to as "FEP", melting point: 275° C.), a copolymer having a repeating unit derived from tetrafluoroethylene and ethylene (hereinafter referred to as "ETFE", melting point: 270° C.), polychlorotrifluoroethylene (hereinafter referred to as "PCTFE", melting point: 220° C.), a copolymer having a repeating unit derived from chlorotrifluoroethylene and ethylene (melting point: 220 to 245° C.), poly(vinylidene fluoride) (hereinafter referred to as "PVdF," melting point 156 to 178° C.), a copolymer having a repeating unit derived from vinylidene fluoride and another fluorinated olefin, a fluorine-containing polymer having a cyclic structure in the main chain (for example, a copolymer having a repeating unit derived from perfluoro-2,2-dimethyldioxisol, a copolymer having a repeating unit derived from perfluoroalkylvinylether, perfluorobutenylvinylether, and the like), and the like. Preferable fluororesins are PFA and FEP, which are often used for articles where impurities are particularly unfavorable.

The condition of the heat treatment for the regeneration ranges from room temperature to the melting point of the fluororesin, preferably from 200° C. to the melting point of the fluororesin, more preferably from 230° C. to the melting point of the fluororesin, and most preferably from 260° C. to the melting point of the fluororesin. For example, when PFA having a melting point of 310° C. is in use, the heat treatment is preferably conducted at a temperature of 230° C. or more, and more preferably 260° C. or more, to the melting point thereof. The heat treatment is conducted for 1 minute to 48 hours, and preferably for 10 minutes to 8 hours.

After the heat treatment, the fluororesin can be further subjected to a fluorination treatment, and the heat treatment can also be conducted in the presence of fluorine gas. The fluorination treatment can be suitably conducted on resins having no hydrogen atom such as FEP, PFA, PTFE, PCTFE, fluorine-containing polymers having a cyclic structure in the main chain, and the like. The fluorination treatment can also be conducted on resins containing hydrogen atoms such as ETFE, PVdF and the like when hydrogen atoms in the resins can be replaces by fluorine atoms by the fluorination treatment.

The fluorination treatment is conducted by contacting the surface of a molded article with fluorine gas at a temperature ranging front room temperature to 300° C. Higher treatment temperatures are preferred for increasing the speed of the treatment (fluorination), with a temperature in the range of 150 to 250° C. being preferred, and with a temperature of 200 to 250° C. being especially preferred. The fluorine gas supplied to the reaction is preferably diluted with an inert gas such as nitrogen gas, helium gas or the like, and is usually contacted with the surface of a molded article in a concentration of 5 to 30% by volume, and preferably 10 to 30% by volume. The duration of time necessary for the treatment is usually 4 to 16 hours although this is variable depending on the reaction temperature and the fluorine concentration.

In the present invention, subjecting a surface-fluorinated, molded article obtained from the fluorination treatment to a heat (annealing) treatment is preferable for removing any residual fluorine gas and any hydrofluoric acid, a by-product generated therein. From the viewpoint of removing residual fluorine gas and hydrofluoric acid as a by-product, the temperature of the heat treatment is about 200 to about 250° C., and preferably 230 to 250° C. The heat treatment is conducted in ambient air, and preferably in nitrogen gas to prevent the deterioration of oxygen by heat. The heat treatment is conducted for 2 to 10 hours, and, usually, 4 to 8 hours is preferable.

Although a used, molded fluororesin article can be subjected to the heat treatment without being pulverized, the article is preferably recycled after being cut into chip-sized pieces with a particle diameter of no more than about 10 mm, and preferably with a particle diameter of about 0.5 to about 5 mm, by a pulverizer.

The heat treatment or supercritical cleaning treatment of the invention can remove inorganic ions such as chlorine ion, sulfate ion, phosphate ion and the like, and organic matter of low molecular weight. The amount of inorganic ions can be measured by ion chromatography, for example, after a fluororesin is extracted in hot water (e.g., at a temperature of 121° C. for 1 hour). The amount of inorganic ions can also be measured by the X-ray fluorescence measurement. The presence of organic matter can be verified by measuring the COD value of the extraction solution obtained from extracting a fluororesin in hot water (e.g., at a temperature of 121° C. for 1 hour). The inorganic ions described above are usually present in the form of an acid such as hydrochloric acid, sulfuric acid, phosphoric acid or the like.

Examples of the method for subjecting a used, molded fluororesin article to the supercritical cleaning treatment include cleaning the article for a specific period of time under temperature and pressure conditions in which a cleaning agent maintains its critical state. For example, the article to be cleaned and a cleaning agent are introduced into a pressure-tight vessel, the cleaning agent is brought to a critical state by subjecting the pressure-tight vessel to a heat treatment, and this condition is maintained for about 5 minutes to about 5 hours. In addition to carbon dioxide, examples of the cleaning agent include ethane, propane, butane, ammonia, nitrous oxide and the like. The heat treatment is conducted at a temperature of 31° C. or more when carbon dioxide is used as a cleaning agent; 97° C. or more when propane is used; 152° C. or more when butane is used; 132° C. or more when ammonia is used; and 36° C. or more when nitrous oxide is used.

The beat treatment of a used, molded fluororesin article conducted in water vapor can be continued for 1 minute to 48 hours. These heat treatments can be employed individually or in combination thereof.

The present invention provides a recycled article wherein a fluororesin has substantially the same degrees of melt flow rate (MFR), flexing resistance, and compression molding properties as those of an unused fluororesin. Further, when the heat treatment is conducted at a temperature of 230° C. or higher, substantially no coloring occurs. Using the fluorination treatment, in particular, coloring components are removed from the recycled article to the extent that the same degree remain as are contained in an unused article.

BEST MODE FOR CARRYING OUT THE INVENTION

Examples and comparative examples are given below to illustrate the invention in more detail.

In the following examples, Samples 1, 2 and 3 are used carriers composed of PFA. Sample 1 contains sulfate, phosphate and chlorine ions. Samples 2 and 3 contain substantially no phosphate or chlorine ions but contain a large amount of sulfate ions.

EXAMPLE 1 AND COMPARATIVE EXAMPLE 1

PFA (trade name: Neofreon PFA A-215SH, manufactured by Daikin Industries, Ltd.) was molded by a 50-ton injection molding machine (manufactured by Sumitomo Heavy Industries, Ltd.) to produce PFA molded articles (samples having dimensions of 3.2×12.7×127 mm). The samples were immersed in concentrated sulfuric acid for 20 days. During this period, the temperature was raised to 180° C. 10 times for a total of 70 hours.

The samples were placed in a hot-air-circulating electric furnace and subjected to a heat treatment at temperatures of 180, 230 and 260° C. for 5 hours, respectively.

Then, elemental analysis was conducted with an fluorescent X-ray spectrometer manufactured by Rigaku International Corporation to verify the presence of sulfur components.

It was confirmed that sulfuric acid can be removed by a heat treatment at a temperature of 230° C. (FIG. 1).

Further, when a sample that had been immersed in sulfuric acid was boiled in purified water for 10 hours, it was found that the boiling treatment with purified water was able to remove substantially no sulfuric acid ions contained in the sample (FIG. 1).

EXAMPLE 2

Used PFA carriers (Samples 1 to 3) were pulverized by a Rapid Granulator manufactured by Kawata MFG, Co., Ltd. The pulverized PFA carrier chips thus obtained were placed in a hot-air-circulating electric furnace and subjected to a heat treatment at a temperature of 260° C. for 5 hours.

Five grams of the resulting chips and 10 cc of purified water were introduced into a screw-top container, and the top was affixed thereto without inserting the packing, thereby creating a slightly open condition. Then, the mixture was extracted at a temperature of 121° C. for 1 hour using a sterilizer, and the $Cl^-$, $PO_4^{3-}$ and $SO_4^{2-}$ ion concentration and COD value of the purified water were calculated by ion chromatography and the Packtest, respectively. Table 1 shows the results.

Further, chips prepared by pulverizing used PFA carriers were introduced into a box-shaped container made of monel metal provided in a convection oven, and the container was filled with a sufficient amount of nitrogen gas. After the temperature in the oven was raised to 230° C., a fluorination treatment was initiated by introducing fluorine gas (diluted to 20% by volume with nitrogen gas) into the box-shaped container at a flow rate of 0.6 liters/min. The fluorination treatment was continued under these conditions for 5 hours, the box-shaped container was allowed to cool down, and the container was filled with nitrogen thereby producing fluorinated, pulverized PFA chips. The $Cl^-$, $PO_4^{3-}$ and $SO_4^{2-}$ ion concentration and COD value of the pulverized chips thus obtained were measured in the same manner as described above. Table 1 shows the results.

Table 1 shows that the negative ion concentration considerably decreases by a heat treatment conducted at a temperature of 260° C. for 5 hours. When a fluorination treatment is further conducted on the sample, the negative ion concentration further decreases to the same degree as that of a virgin fluororesin. And, due to the fluorination treatment, no organic matter was detected.

The following methods were used to determine melt flow rate (MFR), flexing resistance (MIT), tensile strength (TS) and elastic limit (EL) of the respective fluororesins. These results are also shown in Table 1.

As shown in Table 1, no deterioration was observed in properties due to the regeneration (heat and fluorination) treatments.

MFR Measurement

The values of melt flow rate were calculated with a melt indexer using a die (diameter: 2 mm, length: 8 mm). When the temperature in the cylinder became stable at 372° C., 6 g of the pulverized carrier chips or the pellets thereof was introduced. This fluororesin was lightly pressed by a pressure cylinder and melted for 5 minutes. Then, a 5-kg load was applied to the resin, sampling was conducted in a specified period of time, and the weight was measured. The data obtained were then converted to 10-minute cycles to obtain the MFR (g/10 min).

MIT Measurement

A sheet having a thickness of 0.20 to 0.23 mm was produced by compression molding. A strip sample having a width of 12.7 mm and a length of 90 mm was then obtained therefrom. The number of ruptures was counted when the sample was subjected to a load of 1.25 kg and an amplitude angle of 135 degrees for 175 cycles per minute by an MIT tester manufactured by Yasuda Seiki Seisakusho.

TS/EL Measurement

A sheet having a thickness of 2.0 mm was produced by compression molding. Samples were then produced by punching it with an ASTM-V dumbbell. A tensile test was conducted using a Tensilon manufactured by A&D to measure the maximum strength and elastic limit.

In Tables 1 and 2, the symbol "A" indicates that a sample is transparent, the symbol "B" indicates that the color of a sample was slightly altered, and the symbol "C" indicates that the color of a sample was changed. Further, in the "Treatment" column of Table 1 the symbol "-" denotes a sample before treatment, "260*5" denotes that a sample was subjected to a heat treatment at a temperature of 260° C. for 5 hours, and "Fluorination" denotes that a sample was subjected to a fluorination treatment at a temperature of 230° C. for 5 hours by introducing fluorine gas (diluted to 20% by volume with nitrogen gas) into a box-shaped container at a flow rate of 0.6 liters/min.

TABLE 1

| Sample | Treatment | Content extracted after being immersed in water at 121° C. for 1 hour | | | COD of extraction solution (ppm) | MFR (g/10 min) | MIT (numbers) | Compact molding | | Degree of coloration |
|---|---|---|---|---|---|---|---|---|---|---|
| | | Cl− | PO$_4^{3-}$ | SO$_4^{2-}$ | | | | TS (MPa) | EL (%) | |
| 1 | — | 4.58 | 0.13 | 0.47 | 8 | 17.5 | 7595 | 28.2 | 322 | C |
| | 260*5 | 0.08 | 0.06 | 0.45 | — | 17.2 | 6546 | 29.7 | 339 | A |
| | Fluorination | 0.01 | 0.00 | 0.03 | 0 | 17.4 | 10318 | 30.4 | 348 | A |
| 2 | — | 0.02 | 0.00 | 0.52 | 5 | 16.3 | 10770 | 30.7 | 337 | C |
| | 260*5 | 0.02 | 0.00 | 0.10 | 2 | 16.2 | 7124 | 29.5 | 334 | B |
| | Fluorination | 0.00 | 0.00 | 0.04 | 0 | 16.4 | 8414 | 31.4 | 354 | A |
| 3 | — | 0.02 | 0.00 | 3.16 | 5 | 15.1 | 6147 | 30.1 | 347 | C |
| | 260*5 | 0.02 | 0.11 | 0.07 | 0 | 15.8 | 6432 | 29.7 | 348 | B |
| | Fluorination | 0.00 | 0.00 | 0.03 | 0 | 15.5 | 6746 | 28.5 | 333 | A |
| Virgin PFA (after molding and pulverizing) | — | 0.12 | 0.00 | 0.02 | 2 | 14.6 | 16004 | 34.6 | 365 | — |
| | 260*5 | 0.03 | 0.00 | 0.02 | 0 | 14.4 | 19066 | 35.1 | 360 | — |

EXAMPLE 3

Used PFA carriers were pulverized by a Rapid Granulator manufactured by Kawata MFG, Co., Ltd. The pulverized carrier chips thus obtained were placed into a hot-air-circulating electric furnace and subjected to a heat treatment at a temperature of 260° C. for 5 hours. The pulverized carrier chips were extruded by a heat fluidity tester manufactured by Yasuda Seiki Seisakusho, producing strands of the fluororesin.

Three kinds of used, molded PFA articles were subjected to a heat treatment according to the conditions shown in Table 1, and the degree of coloration of the strands was observed. Table 2 shows the results.

TABLE 2

| Treatment temperature | Before treatment | 150 | 200 | 230 | 260 | 290 | 260 | 260 | 260 |
|---|---|---|---|---|---|---|---|---|---|
| Time | — | 5 | 5 | 5 | 5 | 5 | 0.16 | 1 | 24 |
| 1 | C | C | B | A | A | A | B | B | A |
| 2 | C | C | B | B | A | A | B | A | A |
| 3 | C | C | B | B | A | A | B | B | A |

As shown in Table 2, coloration can be prevented when the heat treatment is conducted at a temperature of 200° C. or more. At a temperature of 230° C. or more, a recycled article that is transparent can be obtained depending on the sample. At a temperature of 260° C. or more, transparent articles can be obtained from all the samples, and the heat treatment is preferably conducted for at least 1 hour.

EXAMPLE 4

Heat Treatment Conducted in Water Vapor

Ten grams of chips prepared by pulverizing used PFA carriers and 20 cc of pure water were introduced into a 100-cc pressure-tight vessel, and the vessel was tightly closed. The entire vessel was placed into a hot-air-circulating electric furnace and subjected to a heat treatment at a temperature of 260° C. for 5 hours. Using the same method described in Example 2, the Cl−, PO$_4^{3-}$ and SO$_4^{2-}$ ion concentration and COD value were measured. Table 3 shows the results.

As can be seen in Table 3, a recycled fluororesin having properties identical to those of an virgin fluororesin can be obtained wherein inorganic ions and organic matter are substantially removed.

TABLE 3

| | Cl−(ppm) | PO$_4^{3-}$ (ppm) | SO$_4^{2-}$ (ppm) | COD (ppm) |
|---|---|---|---|---|
| Example 4 | 0.03 | 0.01 | 0.10 | 0 |
| Example 5 | 0.10 | 0.08 | 0.27 | 0 |
| Virgin PFA | 0.12 | 0.00 | 0.02 | 2 |

EXAMPLE 5

Supercritical Cleaning Treatment

Ten grams of chips prepared by pulverizing used PFA carriers and 80 grams of dry ice were introduced into a 100-cc pressure-tight vessel, and the vessel was tightly closed. The entire vessel was placed into a hot-air-circulating electric furnace and subjected to a heat treatment at a temperature of 260° C. for 5 hours. Using the same method described in Example 2, the Cl−, PO$_4^{3-}$ and SO$_4^{2-}$ ion concentration and COD value were measured. Table 3 shows the results.

As can be seen in Table 3, a recycled fluororesin having properties identical to those of an unused fluororesin can be obtained wherein inorganic ions and organic matter are substantially removed.

The invention claimed is:
1. A method for producing a recycled fluororesin for molded fluororesin article, comprising subjecting a used, melt-molded fluororesin article to a heat treatment under a temperature condition ranging from 230° C. to the melting point thereof,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs).

2. A method for producing a recycled fluororesin according to claim 1, wherein the used, melt-molded fluororesin article is subjected to a heat treatment under a temperature condition ranging from 260° C. to the melting point thereof.

3. A method for producing a recycled fluororesin, comprising subjecting a used, melt-molded fluororesin article to a heat treatment under a temperature condition ranging from room temperature to the melting point thereof, wherein the heat treatment is conducted in water vapor,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs).

4. A method for producing a recycled fluororesin, comprising subjecting a used, melt-molded fluororesin article to a supercritical cleaning treatment under a temperature condition ranging from room temperature to the melting point thereof,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs).

5. A method for producing a recycled fluororesin according to claim 1, wherein the method comprises a step for cutting the used, melt-molded fluororesin article into chip-sized pieces before the heat treatment.

6. A method for producing a recycled fluororesin according to claim 5, wherein the fluororesin article is cut into chip-size pieces having a diameter of 0.5 to 10 mm.

7. A method for producing a recycled fluororesin according to claim 1, wherein the used, melt-molded fluororesin is a copolymer having a repeating unit derived from tetrafluoroethylene and perfluoro (alkylvinylether) or a copolymer having a repeating unit derived from tetrafluoroethylene and hexafluoropropylene.

8. A recycled fluororesin article containing substantially no impurities, the article being obtained according to the method of claim 1.

9. A method for producing a recycled fluororesin for molded fluororesin article, comprising
  subjecting a used, melt-molded fluororesin article to a heat treatment under a temperature condition ranging from room temperature to the melting point thereof,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs), and
  subjecting the used, melt-molded fluororesin article to fluorination conducted simultaneously with or after the heat treatment of the used, melt-molded fluororesin article.

10. A method for producing a recycled fluororesin according to claim 9, wherein the process of fluorination comprises contacting with fluorine gas at a temperature of 150° C. to 250° C.

11. A method for producing a recycled fluororesin, comprising subjecting a used, melt-molded fluororesin article to a heat treatment under a temperature condition ranging from 230° C. to the melting point thereof,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs), and
  mixing an unused fluororesin with the heat-treated, used, melt-molded fluororesin article.

12. A method for producing a recycled fluororesin for molded fluororesin article, comprising subjecting a used, melt-molded fluororesin article to a heat treatment under a temperature condition ranging from 200° C. to the melting point thereof,
  wherein the fluororesin is one or more fluororesins selected from the group consisting of polytetrafluoroethylene, copolymers having repeating units derived from tetrafluoroethylene and one or more perfluoro (alkylvinylether)s (PFAs), copolymers having repeating units derived from tetrafluoroethylene and hexafluoropropylene (FEPs), and copolymers having repeating units derived from tetrafluoroethylene and ethylene (ETFEs).

13. A method for producing a recycled fluororesin according to claim 4, wherein the method comprises a step for cutting the used, melt-molded fluororesin article into chip-sized pieces before the supercritical cleaning treatment.

14. A method for producing a recycled fluororesin according to claim 13, wherein the fluororesin article is cut into chip-sized pieces having a diameter of 0.5 to 10 mm.

* * * * *